(12) United States Patent
Matsui

(10) Patent No.: US 10,411,449 B2
(45) Date of Patent: Sep. 10, 2019

(54) ELECTRICAL JUNCTION BOX AND WATERPROOFING STRUCTURE FOR ELECTRICAL JUNCTION BOX

(71) Applicant: Sumitomo Wiring Systems, Ltd., Yokkaichi, Mie (JP)

(72) Inventor: Toshiyuki Matsui, Mie (JP)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 0 days.

(21) Appl. No.: 15/577,594

(22) PCT Filed: May 16, 2016

(86) PCT No.: PCT/JP2016/064418
§ 371 (c)(1),
(2) Date: Nov. 28, 2017

(87) PCT Pub. No.: WO2016/194588
PCT Pub. Date: Dec. 8, 2016

(65) Prior Publication Data
US 2018/0337522 A1 Nov. 22, 2018

(30) Foreign Application Priority Data
Jun. 5, 2015 (JP) .................................. 2015-114637

(51) Int. Cl.
*H02G 3/08* (2006.01)
*B60R 16/02* (2006.01)
*B60R 16/023* (2006.01)

(52) U.S. Cl.
CPC ............. *H02G 3/088* (2013.01); *B60R 16/02* (2013.01); *B60R 16/0238* (2013.01); *H02G 3/081* (2013.01)

(58) Field of Classification Search
CPC .......... H02G 3/088; H02G 3/081; H02G 3/14; H02G 3/16; H05K 5/02
See application file for complete search history.

(56) References Cited

U.S. PATENT DOCUMENTS 6,787,698 B2 * 9/2004 Higuchi ................ H02G 3/088
174/50
9,981,618 B2 * 5/2018 Kawaguchi ............ H01R 9/226
(Continued)

FOREIGN PATENT DOCUMENTS

JP    H07-298451 A    11/1995
JP    2003-319530 A    11/2003
(Continued)

OTHER PUBLICATIONS

Search Report for PCT/JP2016/064418, dated Jun. 7, 2016.

*Primary Examiner* — Dhiru R Patel
(74) *Attorney, Agent, or Firm* — Honigman LLP

(57) ABSTRACT

Provided is an electrical junction box including a lower case and an upper case joined to the lower case, wherein the upper case includes an inner wall that opposes an inner surface of the lower case and an outer wall that opposes an outer surface of the lower case, the outer wall has a first wall portion that is in intimate contact with the outer surface of the lower case and a second wall portion that extends upward continuously from the first wall portion, and an upper end of the lower case is inserted between the inner wall and the second wall portion with clearances CL1 and CL2.

2 Claims, 11 Drawing Sheets

(56) References Cited

U.S. PATENT DOCUMENTS

| | | | |
|---|---|---|---|
| 10,153,628 B2* | 12/2018 | Thompson | ............. H02G 3/088 |
| 2003/0230574 A1 | 12/2003 | Okada | |
| 2012/0327562 A1 | 12/2012 | Hara et al. | |
| 2015/0171608 A1 | 6/2015 | Ueyama | |

FOREIGN PATENT DOCUMENTS

| | | |
|---|---|---|
| JP | 2013-005675 A | 1/2013 |
| JP | 2014-027723 A | 2/2014 |
| JP | 2014-236654 A | 12/2014 |

\* cited by examiner

ELECTRICAL JUNCTION BOX AND WATERPROOFING STRUCTURE FOR ELECTRICAL JUNCTION BOX

CROSS-REFERENCE TO RELATED APPLICATIONS

This application is the U.S. national stage of PCT/JP2016/064418 filed May 16, 2016, which claims priority of Japanese Patent Application No. JP 2015-114637 filed Jun. 5, 2015.

TECHNICAL FIELD

The present invention relates to an electrical junction box.

BACKGROUND

Electrical junction boxes that are installed in vehicles are provided with a waterproofing structure so as to prevent water from intruding into the electrical junction boxes during driving in the rain or during washing of the vehicles. In an electrical junction box disclosed in JP 2014-27723A, a body case and an upper cover attached to the body case each have a double-wall structure, and an outer wall of the body case is inserted between outer and inner walls of the upper cover. A leading end of the outer wall of the upper cover and an upper end of the outer wall of the body case have stepped shapes that come into contact with each other. Water intruding into the body case through a gap at a seam between the outer wall of the upper cover and the outer wall of the body case is discharged from a drain outlet in a lower cover.

Incidentally, according to JP 2014-27723A, although intrusion of water into the body case is made difficult by the leading end of the outer wall of the upper cover and the upper end of the outer wall of the body case having the stepped shapes, the gap is formed at the seam between the outer wall of the upper cover and the outer wall of the body case, and therefore, there is a possibility that water intruding from the gap at the seam may pass between the stepped shapes and thus intrude into the body case. According to JP 2014-27723A, a drainage structure is provided by the body case having a double wall, and water intruding into the body case is discharged through the drainage structure. However, there is a problem in that, as a result of having such a double-wall drainage structure, the configuration is complex.

The present invention was made based on circumstances such as those described above, and it is an object thereof to provide an electrical junction box with which intrusion of water into a case can be suppressed with a simple configuration.

SUMMARY

The present invention provides an electrical junction box including a lower case and an upper case joined to the lower case, wherein the upper case includes an inner wall that opposes an inner surface of the lower case and an outer wall that opposes an outer surface of the lower case, the outer wall has a first wall portion that is in intimate contact with the outer surface of the lower case and a second wall portion that extends upward continuously from the first wall portion, and an upper end portion of the lower case is inserted between the inner wall and the second wall portion with a clearance.

The present invention also provides a waterproofing structure for an electrical junction box between a lower case and an upper case joined to the lower case, wherein the upper case includes an inner wall that opposes an inner surface of the lower case and an outer wall that opposes an outer surface of the lower case, the outer wall has a first wall portion that is in intimate contact with the outer surface of the lower case and a second wall portion that extends upward continuously from the first wall portion, and an upper end portion of the lower case is inserted between the inner wall and the second wall portion with a clearance.

According to the above-described configurations, since the first wall portion is in intimate contact with the outer surface of the lower case, intrusion of water into the cases can be suppressed with a simple configuration. On the other hand, since the upper end portion of the lower case is inserted between the inner wall and the second wall portion with a clearance, the operation of joining the lower case and the upper case together can be easily performed.

The following embodiments are preferred as embodiments of the present invention.

The lower case has a protruding portion that protrudes toward the first wall portion, and an inclined portion in which a protruding dimension of the protruding portion decreases upward is formed in the protruding portion.

With this configuration, the operation of fitting the lower case and the upper case to each other can be facilitated by the inclined portion.

A space in which intruding water moves along the inclined portion is formed between the inclined portion and the outer wall, and at an end portion with respect to a direction in which the inclined portion extends, the lower case and the upper case overlap each other with a gap left therebetween, the gap extending to a position at which the gap reaches a lower end portion of the upper case.

With this configuration, even if water has intruded to the inclined portion, the intruding water can be made to move along the inclined portion and be discharged downward through the gap between the upper case and the lower case.

The inner wall and the outer wall are connected to each other via a connecting portion, and the connecting portion is in intimate contact with an upper end of the lower case.

With this configuration, even if water has intruded from between the lower case and the first wall portion of the upper case, the intimate contact between the connecting portion and the upper end of the lower case can restrict intrusion of water into the cases.

Advantageous Effects

According to the present invention, intrusion of water into a case can be suppressed with a simple configuration.

DETAILED DESCRIPTION OF PREFERRED EMBODIMENTS

Embodiment 1

An electrical junction box 10 of Embodiment 1 will be described with reference to FIGS. 1 to 11.

The electrical junction box 10 of the present embodiment is installed, for example, on a path between a power supply such as a battery and a load constituted by a piece of in-vehicle electrical equipment, a motor, and the like, in a vehicle such as an electric automobile or a hybrid automobile. In the following description, a direction X is taken as the forward direction, a direction Y as the upward direction, and a direction Z as the rightward direction.

Electrical Junction Box 10

Figure 6:
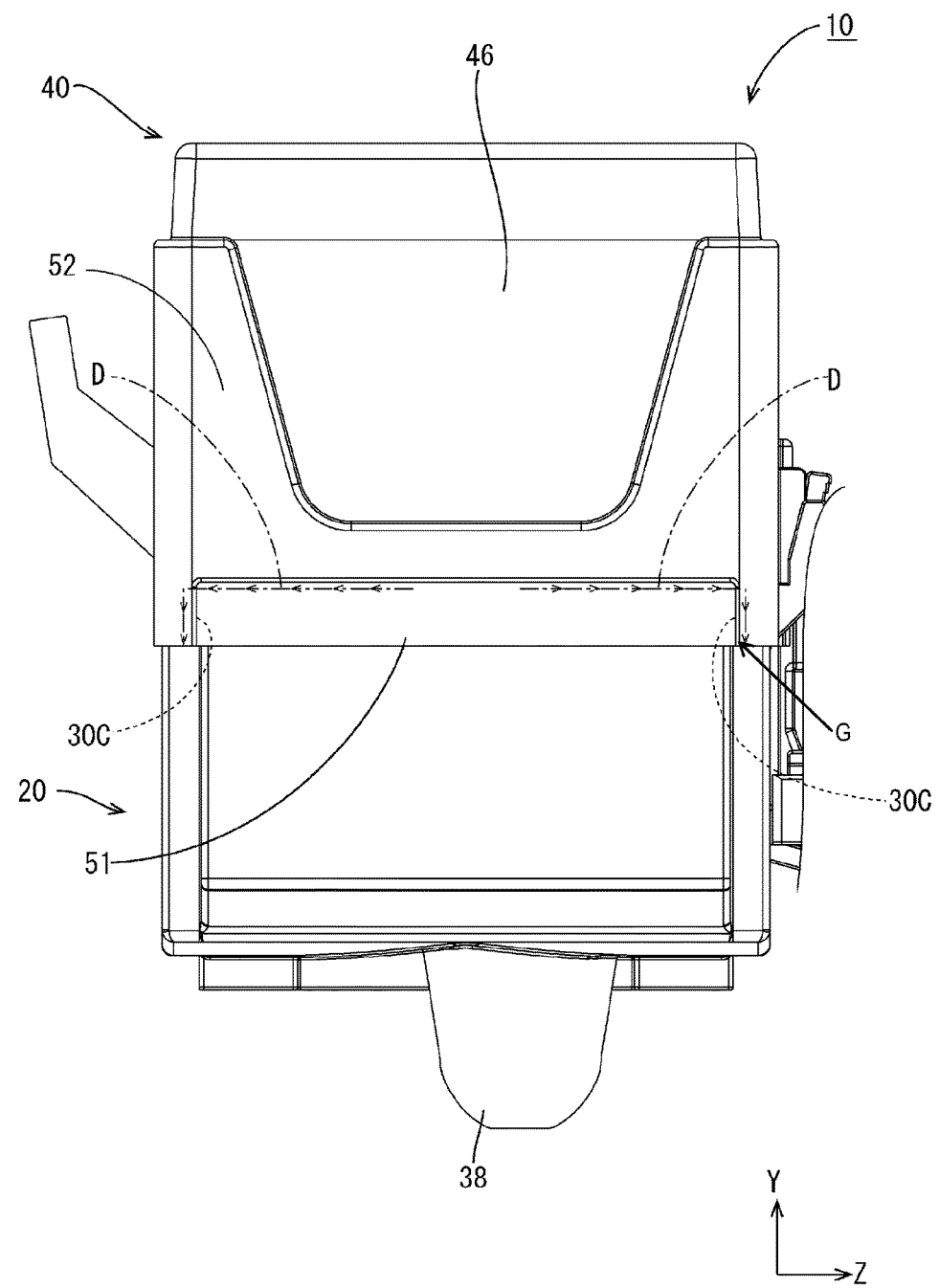
FIG. 6 is a front view showing the electrical junction box with a portion thereof omitted.

The electrical junction box 10 is connected to terminal portions of two wire harnesses, upper and lower wire harnesses 11, that are connected to different systems in the vehicle, and includes, as shown in FIG. 6, a lower case 20 and an upper case 40 that is fitted to the lower case 20. A circuit portion 12 (see FIG. 1) is accommodated inside the electrical junction box 10. The wire harnesses 11 each include a plurality of wires that are collectively enclosed by a corrugated tube made of a synthetic resin. All of the plurality of wires are coated wires each having a conductor portion formed of, for example, a stranded wire constituted by metal elemental wires that are twisted together, a single core wire, or the like, and an insulating layer with which the circumference of the conductor portion is coated. The corrugated tubes are sheathing members in which protrusions and recesses are alternatingly formed in a wave-like pattern. The terminal portions of the wire harnesses 11 are attached and fixed to a portion of a right side face between the lower case 20 and the upper case 40.

The circuit portion 12 includes a circuit board on which electronic components such as a coil, a capacitor, and a relay are mounted. For example, a plurality of circuit portions 12 can be accommodated between the lower case 20 and the upper case 40 as a plurality of circuit units that are covered by synthetic resin inner cases, which are not shown.

Lower Case 20

Figure 7:
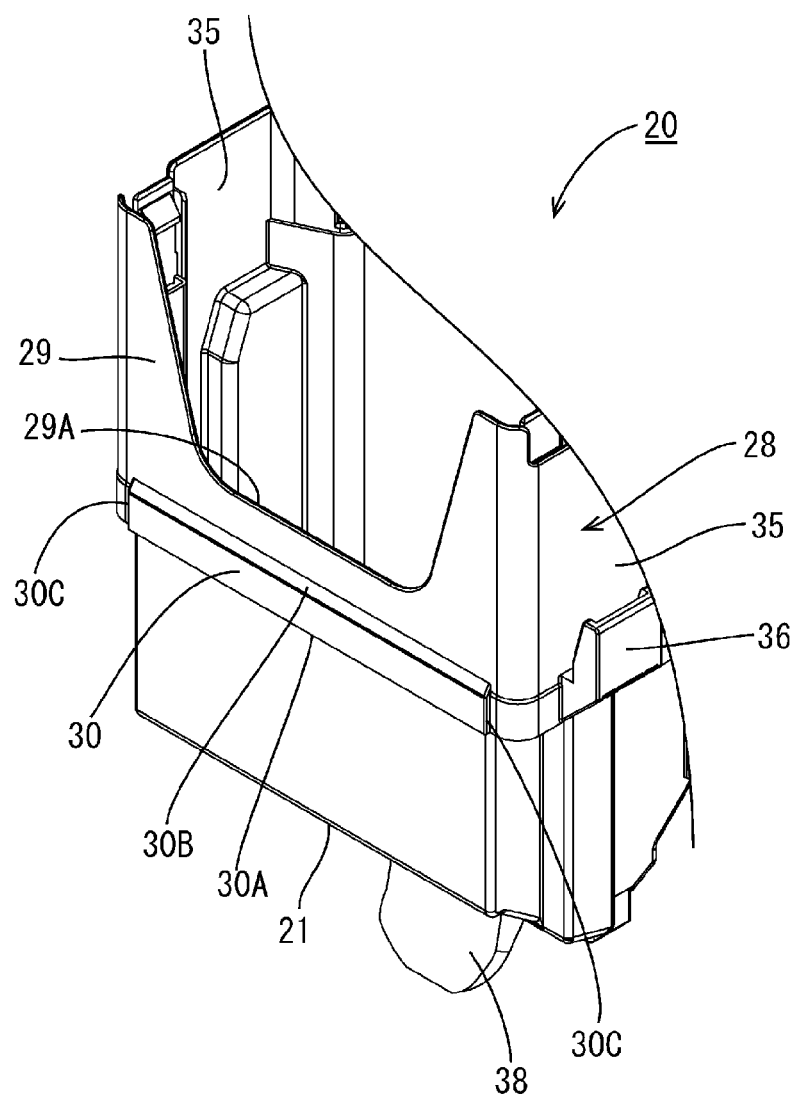
FIG. 7 is a perspective view showing a lower case with a portion thereof omitted.

The lower case 20 is made of a synthetic resin having insulating properties. As shown in FIG. 7, the lower case 20 has a box-like shape whose upper portion is open in a rectangular shape, includes a bottom surface portion 21 and a peripheral wall 28 extending upright from the bottom surface portion 21 and having a rectangular tubular shape, and is provided with a plurality of attachment portions 38 that are to be attached to the vehicle.

Figure 1:
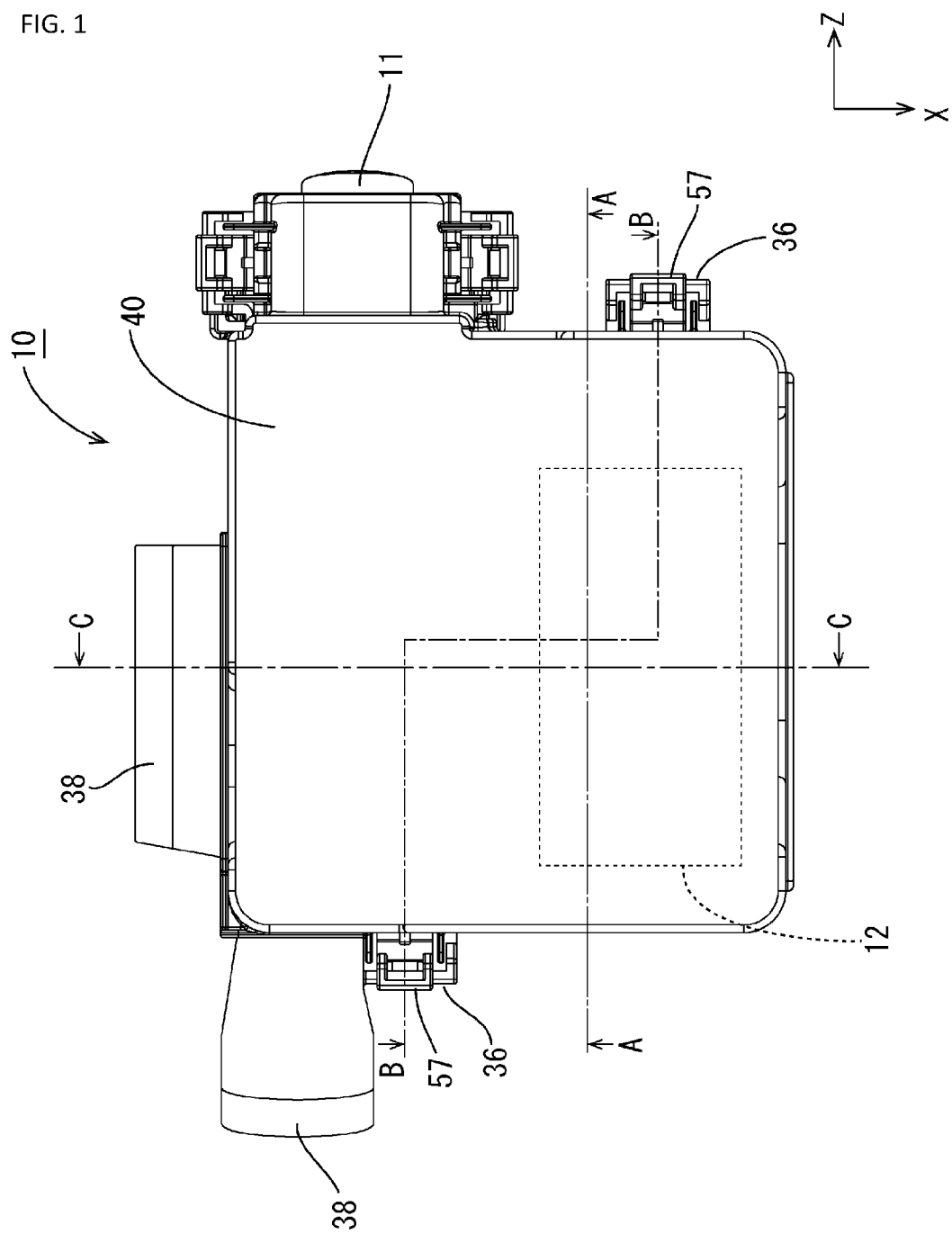
FIG. 1 is a plan view showing an electrical junction box of an embodiment.
Figure 2:
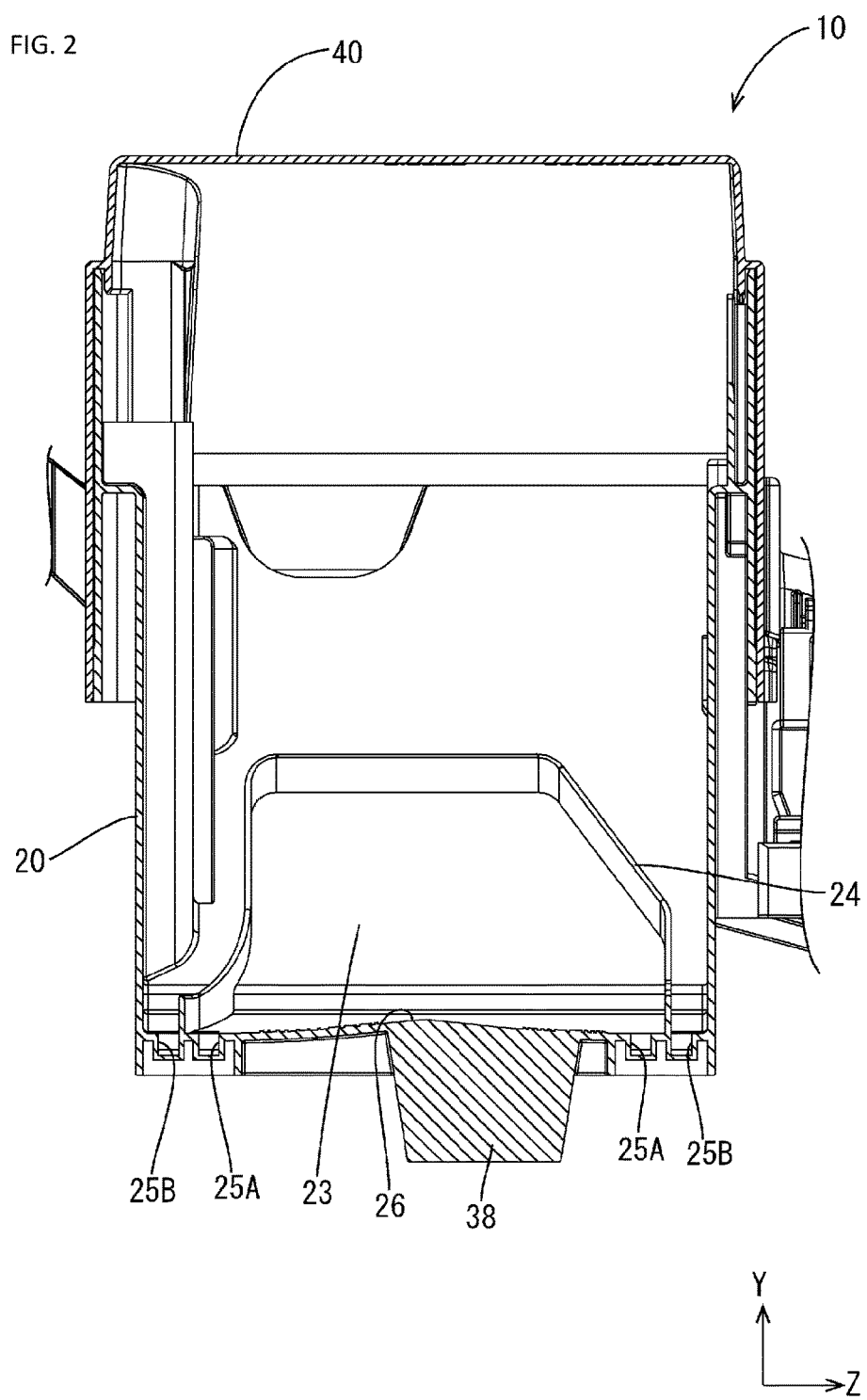
FIG. 2 shows a cross section taken along A-A in FIG. 1 with a portion thereof omitted.
Figure 3:
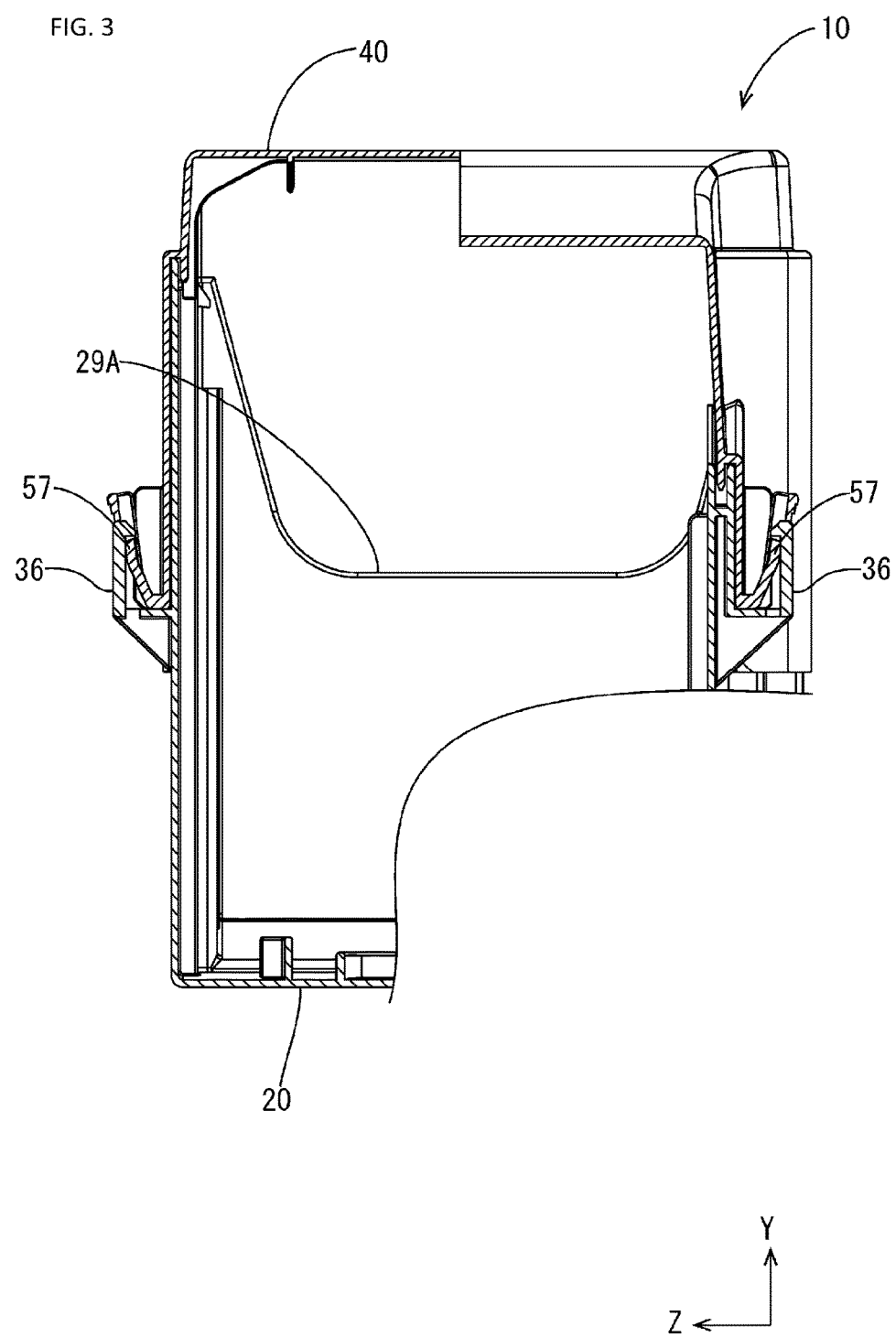
FIG. 3 shows a cross section taken along B-B in FIG. 1 with a portion thereof omitted.
Figure 4:
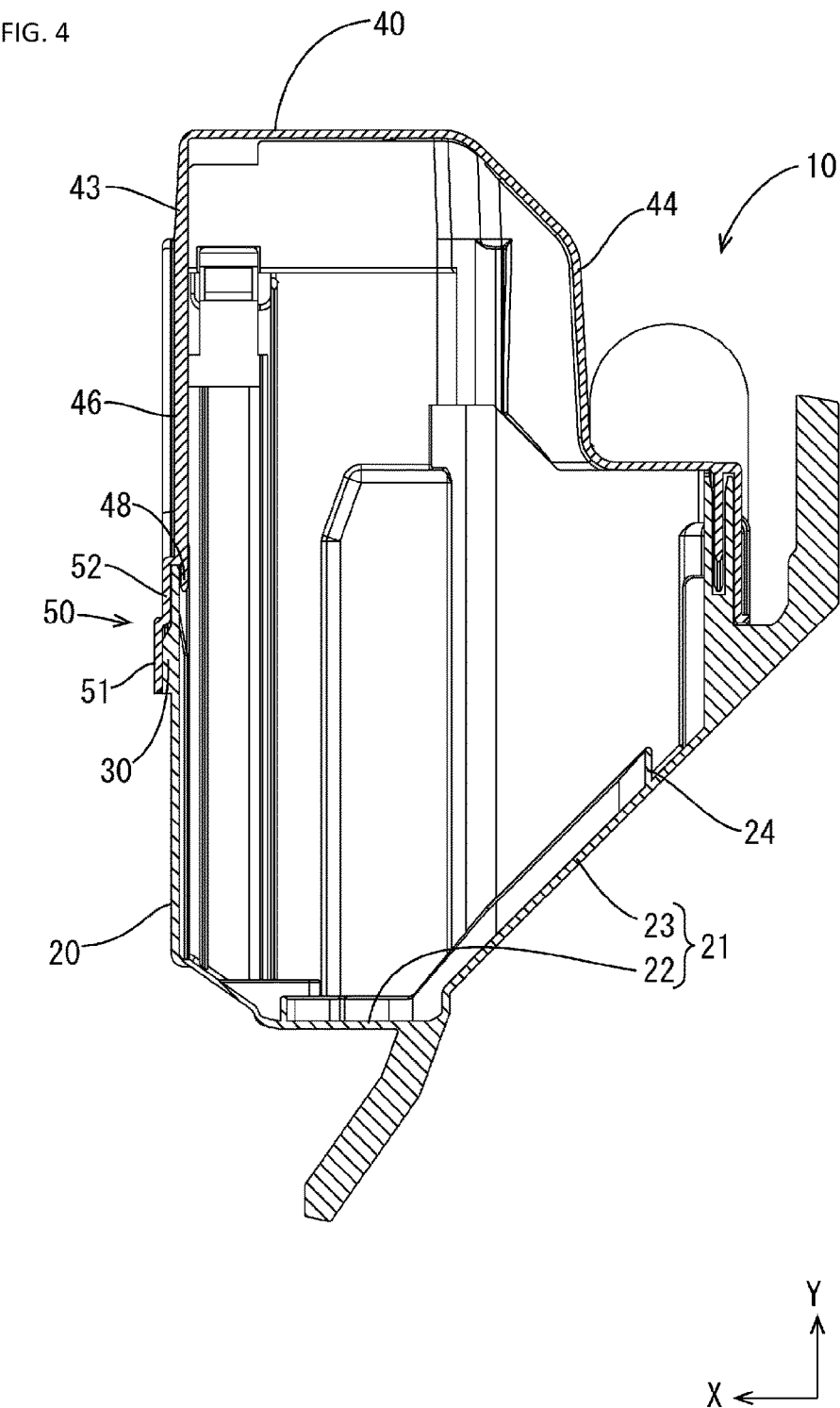
FIG. 4 shows a cross section taken along C-C in FIG. 1.
Figure 8:
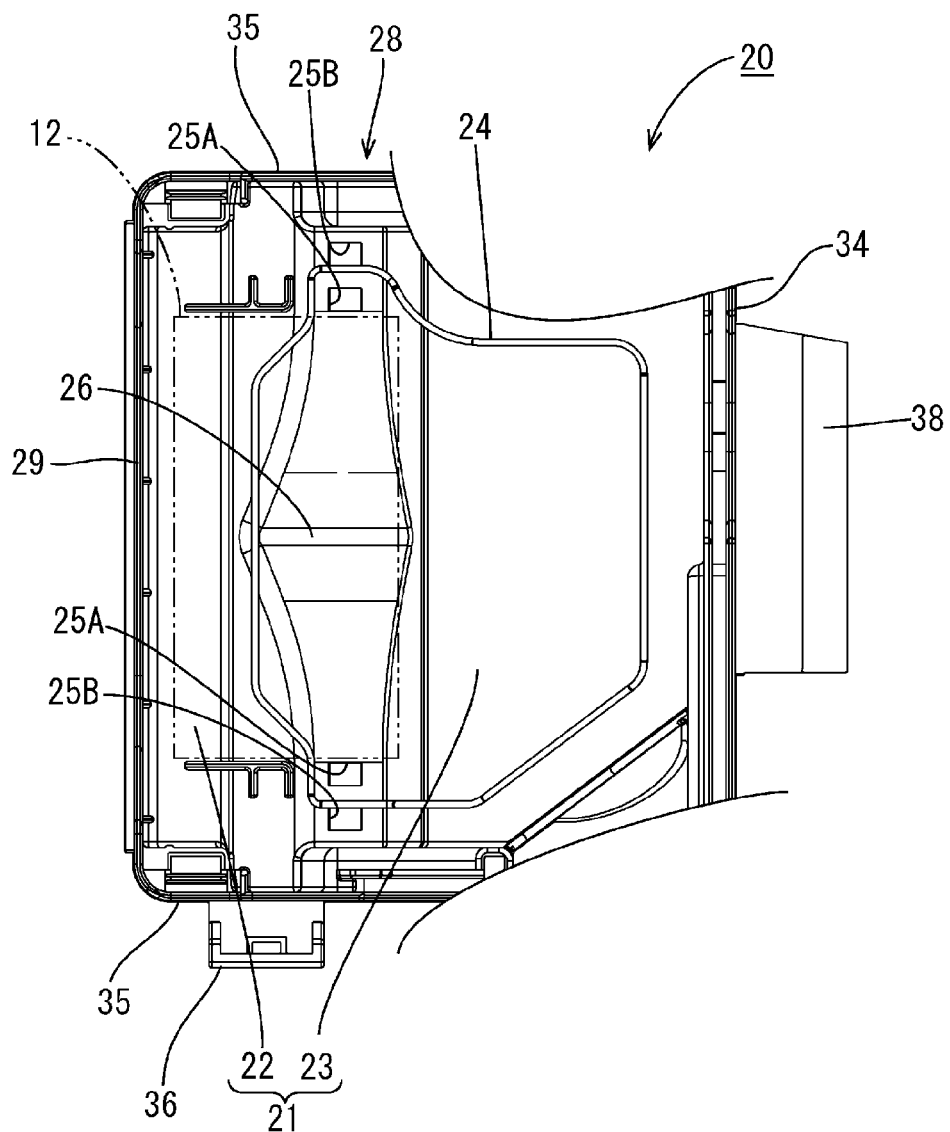
FIG. 8 is a plan view showing the lower case with a portion thereof omitted.
Figure 9:
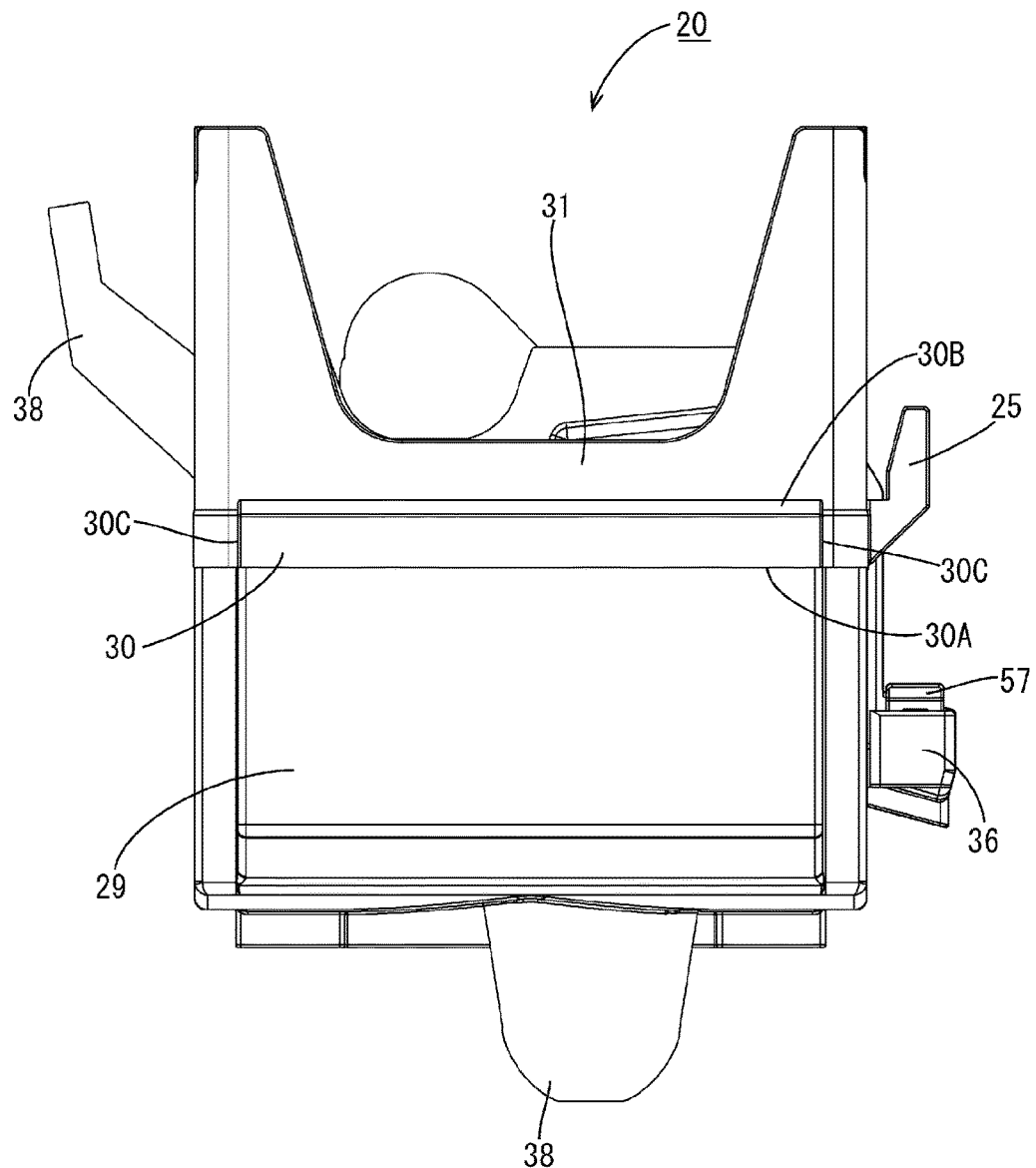
FIG. 9 is a front view showing the lower case.

As shown in FIGS. 4 and 8, the bottom surface portion 21 includes a flat surface portion 22 extending in the horizontal direction and a sloping surface portion 23 extending obliquely upward from an end portion of the flat surface portion 22. A loop-shaped drainage rib 24 protruding upward from the bottom surface portion 21 is provided so as to extend on both the sloping surface portion 23 and the flat surface portion 22 along the peripheral wall 28. Drain outlets 25A and 25B that are in communication with the outside are provided in the flat surface portion 22. Water intruding into a portion that is located in the lower case 20 and outward of the drainage rib 24 is guided from a drainage path outward of the drainage rib 24 to the drain outlets 25B and discharged therefrom. A ridge portion 26 is provided on the flat surface portion 22 inward of the drainage rib 24, the ridge portion 26 being slightly raised in a mountain-like shape and guiding water to the drain outlets 25A.

As shown in FIGS. 7 and 8, the peripheral wall 28 has different heights at different positions with respect to the circumferential direction, and includes a front wall 29, a rear wall 34 that opposes the front wall 29, and a pair of side walls 35 that connect the front wall 29 and the rear wall 34 to each other. The pair of side walls 35 are provided with respective case locked portions 36. The case locked portions 36 each have a locking protrusion that protrudes inward, and hold the lower case 20 and the upper case 40 in a fitted state when locked by respective case locking portions 57 of the upper case 40.

Figure 5:
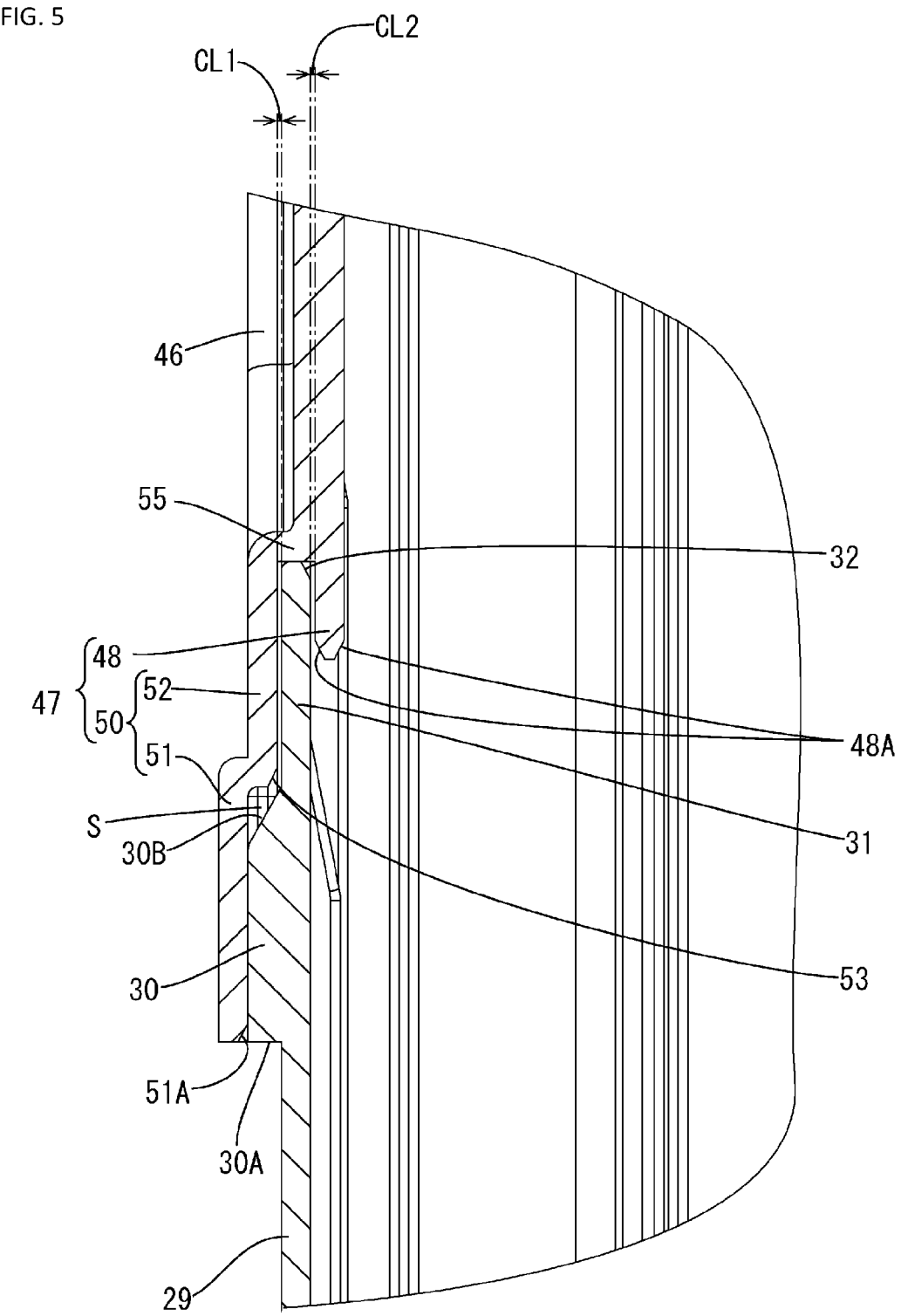
FIG. 5 shows a portion of FIG. 4 in an enlarged manner.

As shown in FIG. 7, the front wall 29 is shaped such that it has a recessed portion 29A that is formed by its upper portion being cut out over a large area and thus recessed. A protruding portion 30 extending in the left-right direction in a band-like form is formed at a substantially middle portion of the front wall 29 with respect to the up-down direction. The protruding portion 30 protrudes outward (forward) over almost the entire width of the front wall 29, and is formed by, as shown in FIG. 5, increasing the thickness of the front wall 29 on an outer surface (front surface) side. The protruding portion 30 includes a step portion 30A at its lower end, the step portion 30A protruding from the front surface in a stepwise manner, and also includes an inclined portion 30B in its upper portion, the inclined portion 30B having an inclined shape with its protruding dimension gradually decreasing upward. A plate-shaped portion 31 having a plate-like shape with a constant thickness is formed above the protruding portion 30. An inner surface side of a leading end portion (upper end portion) of the plate-shaped portion 31 is cut out in a tapered manner to form a cut-out portion 32.

Upper Case 40

Figure 10:
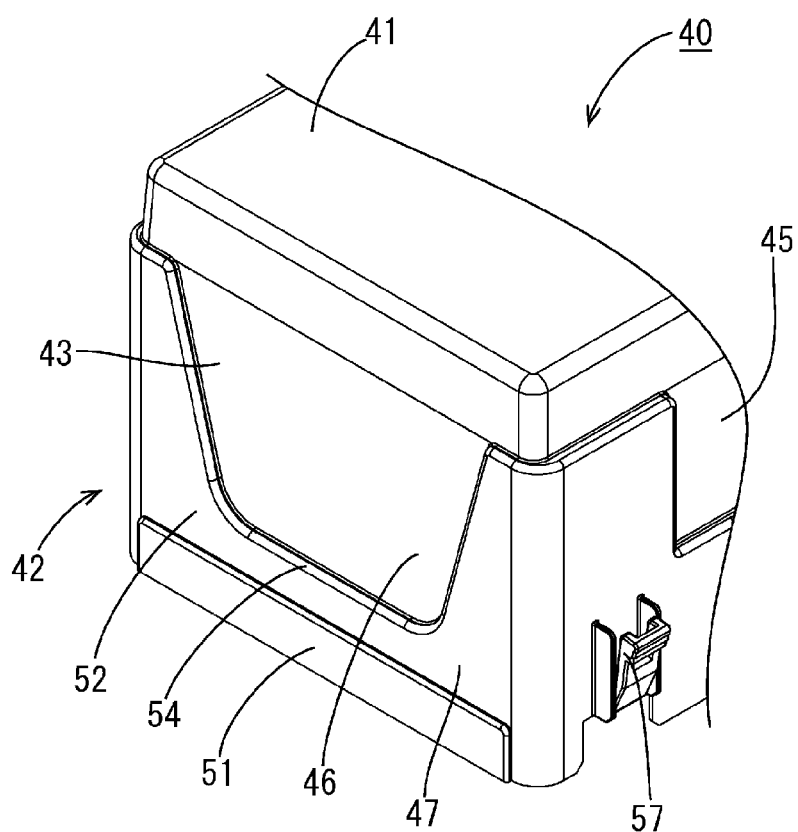
FIG. 10 is a perspective view showing an upper case with a portion thereof omitted.
Figure 11:
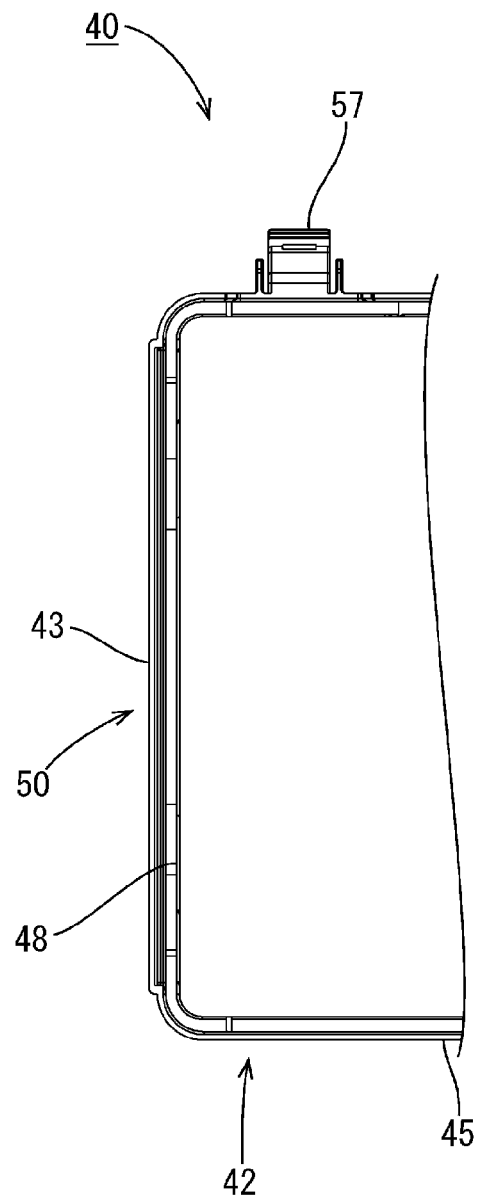
FIG. 11 is a bottom view showing the upper case with a portion thereof omitted.

The upper case 40 is made of a synthetic resin having insulating properties. As shown in FIGS. 10 and 11, the upper case 40 has a box-like shape whose lower portion is open in a rectangular shape, and includes a rectangular top portion 41 and a peripheral wall 42 extending downward from the top portion 41 and having a rectangular tubular shape. The peripheral wall 42 is constituted by a front wall 43, a rear wall 44 (see FIG. 4) that opposes the front wall 43, and a pair of side walls 45 that connect the front wall 43 and the rear wall 44 to each other, the front, rear, and side walls being continuously connected into the rectangular tubular shape. On outer surfaces of the pair of side walls 45, as shown in FIG. 10, the case locking portions 57 capable of locking with the respective case locked portions 36 extend upward from lower end portions of the respective side walls 45 in a flexurally deformable manner.

The peripheral wall 42 includes a wall body 46 that is disposed above the lower case 20 and an overlapping portion 47 that overlaps the lower case 20. The overlapping portion 47 extends in a rectangular tubular shape so as to overlap the peripheral wall 28 of the lower case 20 over the entire perimeter thereof, and includes, as shown in FIG. 5, an inner wall 48 that protrudes downward and an outer wall 50 that is disposed opposing the inner wall 48 at a distance therefrom. The inner wall 48 is a portion that overlaps the inner side of the lower case 20, and is shorter than the length of the plate-shaped portion 31 of the lower case 20 in the up-down direction. Both the inner side and the outer side of a leading end portion of the inner wall 48 are cut out in a tapered manner to form cut-out portions 48A. The inner wall 48 is connected to the outer wall 50 via a connecting portion 55.

The outer wall 50 is a portion that overlaps the outer side of the lower case 20, and includes a first wall portion 51 that is provided at a lower end portion of the front wall 43 and is in intimate contact with the outer surface of the lower case 20 and a second wall portion 52 that opposes an outer surface of the plate-shaped portion 31 of the lower case 20 with a clearance (CL1) therebetween. The first wall portion 51 is provided in only the front wall 43 of the peripheral wall 42, and extends in a band-like form over the entire width of the lower end portion (portion extending downward continuously from the second wall portion 52) of the front wall 43.

The second wall portion 52 is provided over the entire perimeter of the peripheral wall 42, and a portion of the second wall portion 52 that is provided in the front wall 43 is provided inward of and parallel to the first wall portion 51. As shown in FIG. 10, the second wall portion 52 of the front wall 43 is shaped such that it has a recessed portion 54 formed by the boundary with the wall body 46 being recessed downward over a large area, and is formed below the wall body 46 so as to overlap the plate-shaped portion 31 of the lower case 20. As shown in FIG. 5, an inner surface side of a lower end of the second wall portion 52, which is located above the first wall portion 51, is cut out in a tapered manner to form a cut-out portion 53. Moreover, the inner surface side of a lower end of the first wall portion 51 is cut out in a tapered manner to form a cut-out portion 51A.

The distance between the inner wall 48 and the second wall portion 52 is set such that when the upper case 40 is joined to the lower case 20 in a proper position relative to the lower case 20, clearances (CL1) and (CL2) are created between the plate-shaped portion 31 and the outer wall 50 and between the inner wall 48 and the plate-shaped portion 31, respectively. The clearances (CL1) and (CL2) are set at appropriate values that can facilitate, when joining the lower case 20 and the upper case 40 together, insertion of the plate-shaped portion 31 between the inner wall 48 and the second wall portion 52 allowing for a joining accuracy error.

When the upper case 40 is moved downward from above the lower case 20 and fitted to the lower case 20, the inner surface of the first wall portion 51 is brought into surface contact with the outer surface of the protruding portion 30 of the lower case 20 over the entire width thereof, thereby creating an intimate contact state. Moreover, the inner surface of the connecting portion 55 is brought into surface contact with the upper end of the plate-shaped portion 31, thereby creating an intimate contact state. Thus, even if high pressure water is sprayed onto the vehicle from a front side during washing of the vehicle, for example, intrusion of water into the cases is restricted by the portions at which the lower case 20 and the upper case 40 are in the intimate contact state. Moreover, even if water has intruded from between the first wall portion 51 and the protruding portion 30, water droplets D that have reached a space (S) between the first wall portion 51 and the inclined portion 30B move in the left-right direction along the inclined portion 30B, as shown in FIG. 6. Then, the water droplets D reach left and right end portions 30C of the protruding portion 30. At each end portion 30C, a gap (G), having almost the same dimension as the clearance (CL1), is formed between the lower case 20 and the upper case 40, and thus the water droplets D are discharged downward from the upper case 40 through the gap (G).

According to the present embodiment, the following effects are achieved.

According to the present embodiment, since the first wall portion 51 of the upper case 40 is in intimate contact with the outer surface of the lower case 20, intrusion of water into the cases can be suppressed with a simple configuration. On the other hand, since the plate-shaped portion 31 (upper end portion of the lower case 20) of the lower case 20 is inserted between the inner wall 48 and the second wall portion 52 with the clearances (CL1) and (CL2), the plate-shaped portion 31 can be easily inserted between the second wall portion 52 and the inner wall 48 even when a dimensional accuracy error occurs, and thus, the operation of joining the lower case 20 and the upper case 40 together can be easily performed.

Moreover, the lower case 20 has the protruding portion 30, which protrudes toward the first wall portion 51, and the inclined portion 30B, in which the protruding dimension decreases upward, is formed in the protruding portion 30.

According to the present embodiment, even in the case where, for example, a dimensional error occurs, the operation of fitting the lower case 20 and the upper case 40 to each other can be facilitated by the inclined portion 30B.

Moreover, the space (S), in which intruding water moves along the inclined portion 30B, is formed between the inclined portion 30B and the outer wall 50. At each of the end portions 30C with respect to the direction in which the inclined portion 30B extends, the lower case 20 and the upper case 40 overlap each other with a gap (G) left therebetween, and this gap (G) is provided extending to a position at which it reaches the lower end portion of the upper case 40.

With this configuration, even if water has intruded to the inclined portion 30B, the intruding water can be made to move along the inclined portion 30B and discharged downward through the gaps (G) between the upper case 40 and the lower case 20.

Moreover, the inner wall 48 and the outer wall 50 are connected to each other via the connecting portion 55, and the connecting portion 55 is in intimate contact with the upper end of the lower case 20.

With this configuration, even if water has intruded from between the lower case 20 and the first wall portion 51 of the upper case 40, the intimate contact between the connecting portion 55 and the upper end of the lower case 20 can restrict intrusion of water into the cases.

OTHER EMBODIMENTS

The present invention is not limited to the embodiment that has been described above with reference to the drawings, and embodiments such as those described below, for example, are also included in the technical scope of the present invention.

(1) According to the foregoing embodiment, the upper end of the front wall 29 of the lower case 20 and the connecting portion 55 of the upper case 40 are in intimate contact with each other. However, the present invention is not limited to this configuration, and a gap (G) may be formed between the upper end of the front wall 29 of the lower case 20 and the connecting portion 55.

(2) According to the foregoing embodiment, when the upper case 40 is joined to the lower case 20 in a proper position relative to the lower case 20, the clearances (CL1) and (CL2) are created between the inner wall 48 and the plate-shaped portion 31 and between the plate-shaped portion 31 and the outer wall 50, respectively. However, the present invention is not limited to this configuration, and a configuration may also be adopted in which a clearance is created in at least one of between the inner wall 48 and the plate-shaped portion 31 and between the plate-shaped portion 31 and the outer wall 50.

The invention claimed is:

1. An electrical junction box comprising a lower case and an upper case joined to the lower case,
   - wherein the upper case includes an inner wall that opposes an inner surface of the lower case and an outer wall that opposes an outer surface of the lower case,
   - the outer wall has a first wall portion that is in intimate contact with the outer surface of the lower case and a second wall portion that extends upward continuously from the first wall portion;
   - an upper end portion of the lower case is inserted between the inner wall and the second wall portion with a clearance;
   - the lower case has a protruding portion that protrudes toward the first wall portion, and an inclined portion in which a protruding dimension of the protruding portion decreases upward is formed in the protruding portion, and
   - wherein a portion of the outer wall is spaced apart from the inclined portion so as to define a space, wherein intruding water moves along the inclined portion and along the space, and wherein the upper case overlaps the lower case so as to define a gap therebetween, the gap being formed at opposite ends of the inclined portion and the gap open to a lower end portion of the upper case so as to allow water to drain.

2. The electrical junction box according claim 1,
   - wherein the inner wall and the outer wall are connected to each other via a connecting portion, and
   - the connecting portion is in intimate contact with an upper end of the lower case.

* * * * *